US006579626B1

(12) United States Patent
Öttinger et al.

(10) Patent No.: US 6,579,626 B1
(45) Date of Patent: Jun. 17, 2003

(54) LAYERED COMPOSITE WITH WELDED INTERMEDIATE METAL LAYER, GASKET, GASKET SHEET, METAL LAYER AND METHOD OF MANUFACTURING A LAYERED COMPOSITE

(75) Inventors: Oswin Öttinger, Meitingen (DE); Manfred Jung, Ellgau (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 09/607,323

(22) Filed: Jun. 30, 2000

(30) Foreign Application Priority Data

Jul. 6, 1999 (DE) .......................... 199 30 931

(51) Int. Cl.[7] .......................... B32B 15/08; F16J 15/12
(52) U.S. Cl. .................. 428/626; 277/651; 277/654; 219/121.64; 428/594; 428/607
(58) Field of Search ................... 428/624, 625, 428/626, 582, 598, 594, 604, 607; 277/651, 654; 228/251; 219/121.63, 121.64

(56) References Cited

U.S. PATENT DOCUMENTS

| 1,446,274 | A | * | 2/1923 | Roberts ..................... 428/594 |
| 1,617,114 | A | * | 2/1927 | Hoehn ........................ 428/594 |
| 1,700,319 | A | * | 1/1929 | Kjekstad .................... 428/594 |
| 2,679,468 | A | * | 5/1954 | Pitman ....................... 154/116 |
| 3,762,028 | A |   | 10/1973 | Swearingen et al. ....... 29/470.1 |
| 4,485,138 | A | * | 11/1984 | Yamamoto et al. ......... 428/131 |
| 4,873,415 | A | * | 10/1989 | Johnson et al. ........ 219/121.64 |
| 5,172,920 | A | * | 12/1992 | Schlenk ................... 277/235 R |
| 5,208,725 | A |   | 5/1993 | Akcasu ........................ 361/313 |
| 5,509,993 | A |   | 4/1996 | Hirschvogel ................ 156/326 |
| 6,048,628 | A | * | 4/2000 | Hillmann et al. ........... 428/594 |
| 6,258,457 | B1 | * | 7/2001 | Otinger et al. .............. 428/408 |

FOREIGN PATENT DOCUMENTS

| DE | 36 17 701 A1 | 12/1987 |
| DE | 38 15 069 A1 | 11/1989 |
| DE | 38 39 792 C2 | 5/1990 |
| DE | 41 08 226 A1 | 9/1992 |
| DE | 43 06 369 C2 | 9/1994 |
| DE | 195 29 542 A1 | 2/1997 |
| DE | 198 04 283 A1 | 8/1999 |
| EP | 0 616 884 B1 | 9/1996 |

OTHER PUBLICATIONS

Erika Fleischer: "Cylinderhead Gaskets in Patent Literature—Part III", MTZ Motortechnische Zeitschrift, vol. 48, 1997, No. 12, pp. I–VIII No Month.

* cited by examiner

Primary Examiner—John J. Zimmerman
(74) Attorney, Agent, or Firm—Laurence A. Greenberg; Werner H. Stemer; Ralph E. Locher

(57) ABSTRACT

A metal-reinforced layered composite includes at least one intermediate metal layer. The intermediate metal layer includes at least two at least partially overlapping metal foils which are joined to one another in an overlap region by at least one weld seam. There are no leakage channels and/or no continuous leakage channels at the weld seam of the metal foils in the longitudinal extent of the overlap region. At least one of the weld seams may have a course which at least at one point has a direction component at right angles to the longitudinal extent of the overlap region of the metal foils. The intermediate metal layer may be provided with at least one passage in the overlap region of the metal foils. A gasket, a gasket sheet, a metal layer and a method of manufacturing a layered composite are also provided.

70 Claims, 8 Drawing Sheets

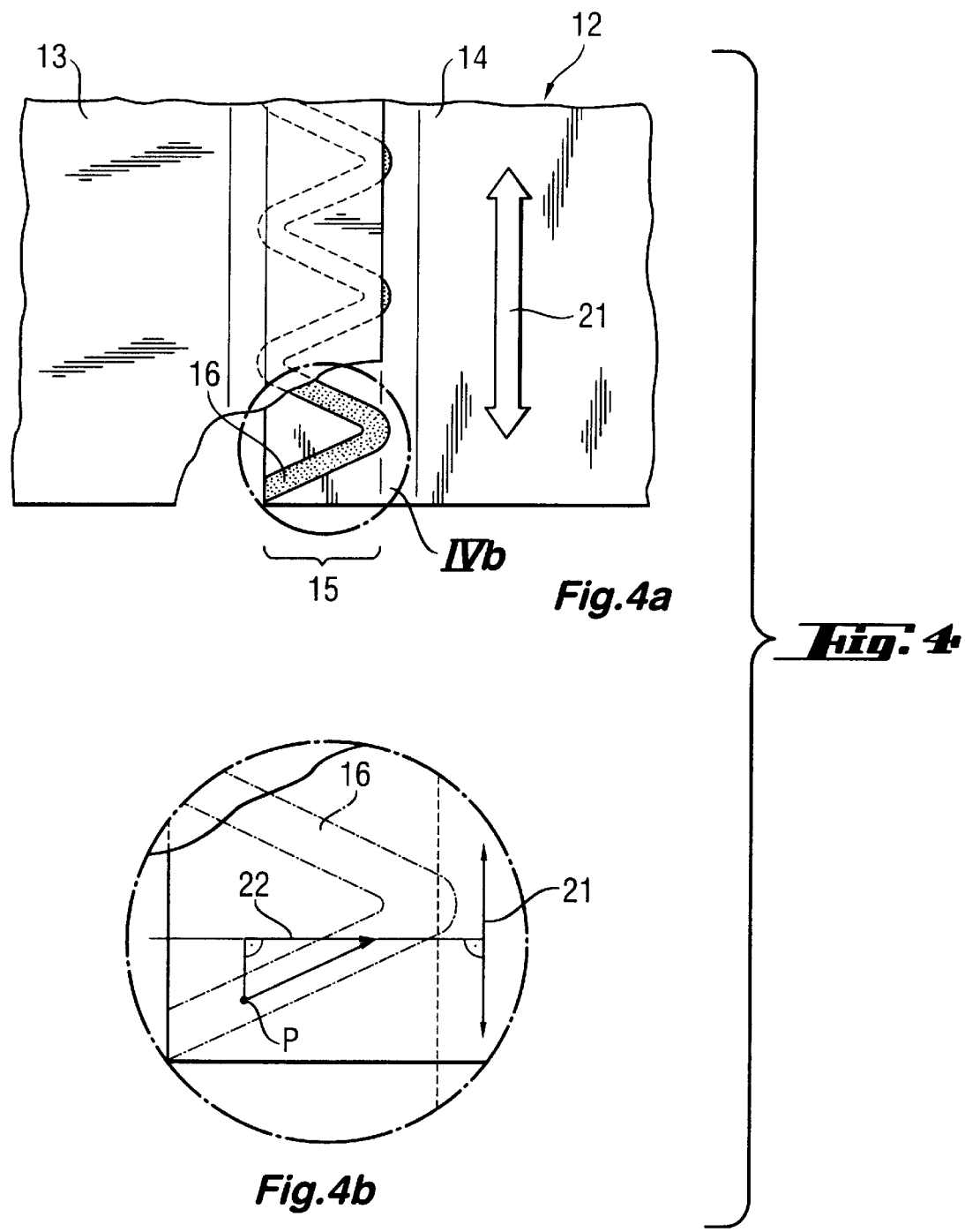

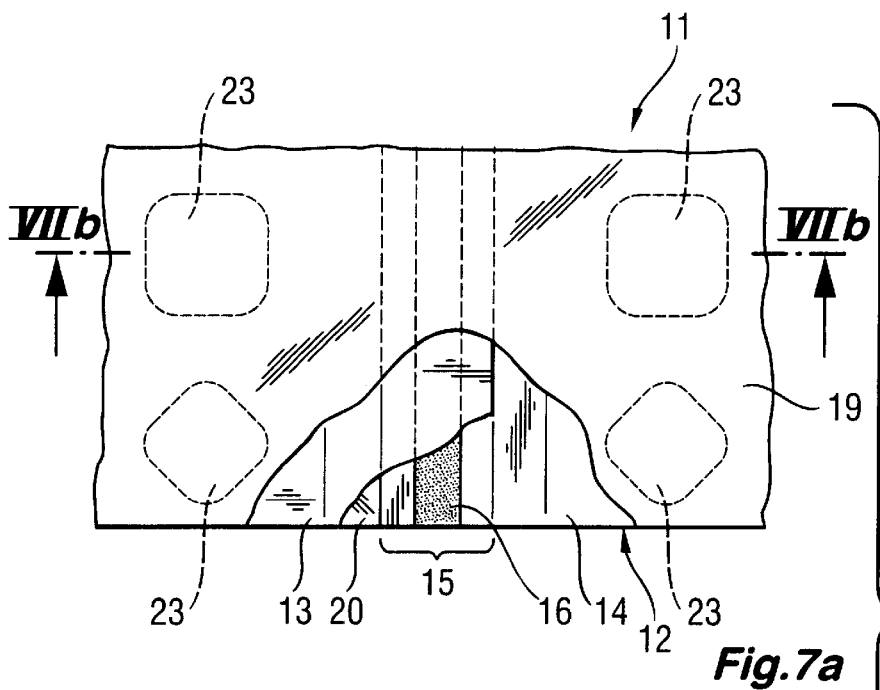
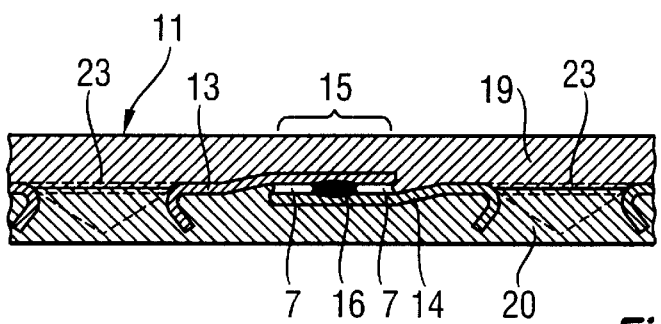
Fig. 7
PRIOR ART

LAYERED COMPOSITE WITH WELDED INTERMEDIATE METAL LAYER, GASKET, GASKET SHEET, METAL LAYER AND METHOD OF MANUFACTURING A LAYERED COMPOSITE

BACKGROUND OF THE INVENTION

Field of the Invention

The present invention relates to metal-reinforced layered composites based on one or more soft materials, in particular to gaskets, gasket sheets and metal layers, as well as to a method of manufacturing the same.

The metal-reinforced layered composites according to the invention have at least one intermediate metal layer. The intermediate metal layer includes at least two at least partially overlapping metal foils which are joined to one another in an overlap area. The invention makes it possible to manufacture large-dimension laminated panels which, as gasket sheets, meet the highest technical standards. Gaskets, in particular flat gaskets in annular form, as shown in FIG. 9, are manufactured by being punched out of the gasket sheets.

Layered composites based on one or more soft materials are often reinforced with thin metal foils to improve their mechanical stability. The soft materials used in layered composites include thermoplastics, above all PTFE-based thermoplastics, and elastomers which may be reinforced with inorganic or organic fibers, such as e.g. aramide, carbon, ceramic and metal fibers. The compressive strength of the soft materials may also be increased by fillers such as e.g. silicon dioxide, aluminum oxide, carbon or graphite in powder form. Furthermore, inorganic and compression-proof materials such as, in particular, mica and graphite may be used as soft materials. Foils and laminates manufactured from expanded graphite, which are jointly referred to below as graphite foils, are also used as special graphite variants. Corresponding layered composites are described, for example, in German Published, Non-Prosecuted Patent Application DE 198 04 283 A1, corresponding to U.S. application Ser. No. 09/244,836 now U.S. Pat. No. 6,258,457. Besides simple metal foils it is also possible to use spiked metal sheets as intermediate metal layers. The spiked metal sheets have spikes which may extend to one or to both sides. In the simplest case, a metal-reinforced layered composite based on one or more soft materials includes a metal foil layer embedded in two soft material layers.

The metal foils are commercially available only up to a limited web width which depends on the material and foil thickness. It is necessary to join together at least two metal foils for the intermediate metal layer to manufacture metal-reinforced layered composites or gasket sheets of such dimensions that the web width of the available metal foils is insufficient to allow the intermediate metal layers of the layered composites to be removed from a metal foil web in one piece.

Until now, such commercial-scale metal-reinforced layered composites have been realized by overlapping metal foil webs at their lateral ends and effecting joining together either by gluing, mechanical interlocking or welding, such as by resistance roll seam welding. The metal foils used for the intermediate metal layer in the layered composites mostly have a small thickness, such as e.g. 50 $\mu$m or 100 $\mu$m, in order to make it easy to punch gaskets out of the layered composites. Therefore, it is generally impossible to carry out butt welding of the metal foils under industrial production conditions.

A method and an apparatus for welding together butt-jointed sheets is known from German Published, Non-Prosecuted Patent Application DE 195 29 542 A1. That method is based on the sheets to be welded together initially overlapping in their marginal region. The overlapping end zones of the marginal regions are then cut off with mutually aligned cut edges, the cut edges are then made to abut one another and finally the cut edges are welded to one another by a laser beam. As a result of that time sequence of process steps, it is impossible, particularly with long webs which are moving, to guarantee that the cut edges at right angles to the direction of motion of the webs will still be in the same position when they reach the welding location as they are when they are cut. Even minor external influences, such as temperature variations or vibrations, as well as tiny undulations in the thin metal foils, may lead to gaps between the cut edges of the webs or a renewed overlap of the webs. A remedy therefor is provided according to the method described in the German Published, Non-Prosecuted Patent Application mentioned above. That is accomplished in the case of long webs and/or large web widths by a guide body which stabilizes the position of the webs relative to one another. That guide body guides the sheet metal webs, which are to be welded together, in such a way that the lateral edge of the webs lies against the base of a slot in the guide body. However, in the case of the metal foils which are used in the layered composites of the gasket sheets, their low thickness of, at times, well below 0.25 mm precludes such guidance by a guide body on a commercial scale. As the metal foil webs move through the guide body, high forces at the base of the guide slot act upon the lateral edge of the metal foil. Due to low stability thereof, those forces are sufficiently high to cause buckling very rapidly and therefore to cause the edge of the foil to be destroyed or even to caused the metal foil to tear. That might be counteracted by a very narrow guide slot but that might lead to the metal foil becoming stuck in the guide slot and therefore possibly tearing. The use of such a guide slot may, moreover, cause the metal foil web to be displaced in such a way as to form a slight undulation or fold in the metal foil web which causes the foil web guidance downstream of the guide slot to run off in an uncontrolled manner. It is therefore impossible to use the butt-welding method described in German Published, Non-Prosecuted Patent Application DE 195 29 542 A1 for the particularly thin metal foils such as are normally used in layered composites for gasket elements.

Heretofore, various techniques have been used to join metal foils for intermediate metal layers for gasket sheets, wherein foil ends overlap in the region of the joint.

In one instance, joining is effected by applying an adhesive, such as e.g. epoxy resin, which hardens, between the overlapping foil ends. In that case, the adhesive is mostly applied over the entire overlap region on at least one of the metal foils which are to be joined. Gluing together of the metal foils has the drawback of only permitting gaskets which are manufactured from layered composites including intermediate metal layers joined in that manner to be used in an extremely limited temperature range. The reason for that limitation is that, at higher temperatures, the adhesive softens and/or is partially thermally decomposed. On one hand, that may lead in the gaskets to the metal foils shearing off more easily from one another at their glued junction points under stress, such as tensile forces in the direction of the metal foils and compressive forces at right angles to the intermediate metal layers, thereby reducing the mechanical stability of the gaskets. Only porous, leaky, pyrolized residues of the adhesive remain in the overlap region between the glued metal foil ends as a result of thermal decomposition of the adhesive. If the pores being produced in the adhesive merge with one another, that may produce extensive continuous channels in the glue residue. The channels in a gasket may even extend from one edge of the gasket to the other and lead to a substantial increase of the leakage rate of the gasket because a medium, which is to be sealed off, may escape out of the gasket through those channels. Such channels, which extend from one gasket edge to the other gasket edge, are referred to below as leakage channels of the gasket. Gaskets having intermediate metal layers, which include metal foils glued to one another, therefore tend to have higher leakage rates at increased temperatures. The use of gaskets, which have intermediate metal layers being formed of metal foils glued to one another, is additionally restricted to media which do not attack the adhesive. That is because otherwise, as a result of the medium attacking the adhesive, on one hand, a shearing of the metal foils under stress is once again possible and therefore the mechanical stability of the gaskets is reduced. On the other hand, the decomposition of the adhesive by the aggressive medium being sealed off may, just as with high temperatures, lead to the formation of leakage channels in the adhesive. As a result, the sealing action of the gasket is no longer guaranteed. In order to provide for the universal use of gaskets manufactured from layered composites, which include intermediate metal layers composed of at least two joined metal foils, it is therefore essential for the joining of the metal foils of the intermediate metal layers to be effected without introducing further media such as, for example, adhesives into the gaskets.

One possible way of joining two metal foils to form a metal layer without the use of additional media is that of pure mechanical interlocking of the foils, which still entails an overlap of the foil ends. In that case, the lateral ends of the metal foils to be joined are interlocked in such a way that the layered composites have the same mechanical stability as in the case of the use of single-piece intermediate metal layers. Such a joint is based on pure contact between the metal foils. However, gaskets manufactured from layered composites having intermediate metal layers joined in such a manner may have much higher leakage rates than gaskets manufactured from layered composites having single-piece intermediate metal layers.

When welding metal foils together according to the prior art, the ends of the metal foils are conveyed in an overlapping manner and joined together by applying heat through the metal foils lying one above the other in the overlap region. The weld seam, i.e. the region where the metal foils are cohesively joined by the applied heat, runs in the longitudinal extent of the overlap region. In that case, the width of the overlap region is generally far greater than the width of the applied weld seam. Through the use of intermediate metal layers welded together in that manner it is possible to achieve a mechanical stability of the layered materials equivalent to that of corresponding layered materials, which include exclusively single-piece intermediate metal layers.

In principle, all known welding methods such as pressure welding, fusion welding, resistance welding and beam welding may be used as a welding method. In that case, continuous and discontinuous methods are used. Resistance welding in the form of spot welding (discontinuous welding) and roll seam welding (continuous welding) is used, above all, with sheets disposed in an overlapping manner. In the case of spot welding, the welding electrodes are placed onto the two metal foils which are to be welded together in the middle of the overlap region and then the foils are melted and joined through the use of a current pulse. In the case of roll seam welding, use is made of disc-shaped contact rollers, through which the overlapping ends of the foil webs are drawn. The result is a linear weld seam which extends in the middle of the overlap region. A central position is selected for welding spots or weld seams in order to guarantee that during welding the welding electrodes or contact rollers are in contact over their entire width with the two metal foils. Otherwise, too high a surface current may lead to the metal foils being burnt away at the welding point. It is moreover also possible to use laser beam welding to join the metal foils in their overlap region. In that case, the energy of the laser beam is absorbed in the form of heat by the metal foils, with the result that the metal foils fuse. In order to guarantee reliable and easy fusion of the metal foils, the laser beam should be positioned in the middle of the overlap region and the two overlapping metal foil webs should be moved relative to the stationary laser. It is thereby possible to produce a linear, cohesive weld seam in the overlap region of the foils.

However, occasionally, considerably higher leakage rates have been measured in gaskets manufactured from layered composites, which included intermediate metal layers joined by welding, as compared to corresponding gaskets, which included exclusively single-piece metal reinforcements. That is also evident from Tables 1 and 2 provided below. In those tables, the leakage rates of gaskets manufactured from layered composites, that included exclusively single-piece intermediate metal layers (Comparative Examples 1/1 and 2/1), are compared with the leakage rates of gaskets manufactured from layered composites, which had intermediate metal layers including at least two at least partially overlapping metal foils and produced by linear weld seams in the overlap region of the foils (Comparative Examples 1/2 and 2/2). As is immediately apparent, gaskets with linearly welded intermediate metal layers show a sealing behavior which is far inferior to that which is technically possible with single-piece intermediate metal layers.

As is apparent from the above, there are many ways of approaching the manufacture of intermediate metal layers for layered composites, in which a plurality of metal foils are joined. However, not one of those approaches has made it possible to also use layered composites with such intermediate metal layers to manufacture gaskets possessing the same properties as previously known gaskets that include exclusively single-piece intermediate metal layers. In particular, that problem imposes limits on the dimensions of layered composites and therefore of gaskets as well.

SUMMARY OF THE INVENTION

It is accordingly an object of the invention to provide a layered composite with a welded intermediate metal layer, a gasket, a gasket sheet, a metal layer and a method of manufacturing a layered composite, which overcome the hereinafore-mentioned disadvantages of the heretofore-known devices and methods of this general type and which provide high-quality, metal-reinforced layered composites based on one or more soft materials with at least one intermediate metal layer including at least two joined metal foils. The layered composites may be used to manufacture gaskets possessing the same properties as gaskets manufactured from corresponding layered composites containing exclusively single-piece intermediate metal layers. Methods of manufacturing corresponding layered composites use intermediate metal layers composed of at least two joined metal foils.

The expression "high-quality" stands, inter alia, for high temperature stability and media resistance as well as high mechanical stability. However, the comparison of the properties of corresponding metal-reinforced layered composites with and without intermediate metal layers manufactured by joining at least two metal foils, relates above all to the leakage rates of gaskets manufactured from the layered composites.

A further object of the present invention is to provide large-sized and inexpensive metal-reinforced layered composites based on one or more soft materials, in particular gasket sheets, which possess the same properties as metal-reinforced layered composites, that previously were conventionally manufactured with single-piece intermediate metal layers. In particular, gaskets manufactured from the large-sized layered composites are to have the same leakage rates as gaskets which were previously manufactured from the conventional layered composites. In order to achieve this object, as already mentioned above, it is necessary for the large-sized layered composites to contain intermediate metal layers which have been manufactured by joining at least two metal foils.

A further object of the invention has, moreover, been to provide gasket sheets from which it is possible to punch out single-piece gaskets, the dimensions of which go beyond the previously available dimensions. The gaskets should nevertheless possess the same properties as the previously available single-piece gaskets of smaller dimensions, particularly with reference to the leakage rates of the gaskets. In order to achieve this object, gasket sheets are required which have dimensions beyond the previously available dimensions without thereby adversely influencing the properties of the gaskets punched out of the gasket sheets.

With the foregoing and other objects in view there is provided, in accordance with the invention, a metal-reinforced layered composite based on at least one soft material, comprising at least one intermediate metal layer, at least one of the intermediate metal layers manufactured by joining at least two at least partially overlapping metal foils with at least one weld seam, and at each weld seam provided in the layered composite and joining two metal foils, there are no leakage channels and/or no continuous leakage channels in a longitudinal extent of the overlap region.

With the objects of the invention in view there is also provided, a method of manufacturing a metal-reinforced layered composite based on at least one soft material, which comprises joining at least partially overlapping metal foils of intermediate metal layers by welding the foils together along a longitudinal direction of an overlap region, at least once, in such a way that in the overlap region between the foils to be welded together, no open regions and/or no continuous open regions arise in the longitudinal extent of the overlap region.

According to the invention, the weld seam is to be directed in the overlap region in such a way that the existence of leakage channels, or at least the existence of continuous leakage channels, in the overlap region is ruled out. This is not guaranteed with a linear weld seam according to the prior art. In that case, non-welded excess lengths of metal foil extending in the longitudinal direction of the overlap region are produced in the overlap region. It is not possible to fill the volume between the excess lengths of metal with the soft material coating of the intermediate layer which is typically provided in the layered composites. As a result, in the case of a linear weld seam, there are open regions at the weld seam in the overlap region between the metal foils, which extend along the overlap region parallel to the weld seam and which, in the event of a use of the layered material as a gasket sheet, act as leakage channels parallel to the weld seam, that are not interrupted. Such leakage channels are similarly to be observed in an intermediate metal layer in which two metal foils are joined by mechanical interlocking. In that case too, excess lengths of metal arise in the region of the interlock and may not be sealed by soft material layers, with the result that open leakage channels are produced along the interlock.

The above-described continuous leakage channels are not produced in the layered composites according to the invention. As a result, leakage rates are achieved for gaskets made from the layered composites according to the invention which match those of gaskets made from layered composites with exclusively single-piece intermediate metal layers, as the test results shown further below verify.

In accordance with another feature of the invention, the welding together of the metal foils may be effected in such a way that the length of the non-continuous leakage channels at the weld seams along the longitudinal extent of the overlap region does not exceed a maximum length of 25 mm. The maximum length of the non-continuous leakage channels at the weld seams along the longitudinal extent of the overlap region is preferably between 0.5 mm and 5 mm, and between 1 and 2 mm in a particularly preferred manner.

In accordance with a further feature of the invention, the metal-reinforced layered composites made from one or more soft materials may, at their outwardly-directed flat sides, additionally be completely covered with and joined to a gas-proof foil made from an organic polymer.

In accordance with an added feature of the invention, at least one of the weld seams may have a shape, which at least at one point has a direction component at right angles to the longitudinal extent of the overlap region of the metal foils. This direction component of the shape of the weld seam, that is provided at least at that point, at right angles to the longitudinal extent of the overlap region, is produced by effecting the welding along a line which has a direction component at right angles to the longitudinal extent of the overlap region of the metal foils.

In the context of the present invention, the line along which the welding is effected, that is also referred to as the welding line, is the line along which the welding apparatus is conveyed relative to the metal foils, wherein the welding apparatus and/or the metal foils move with clearance.

In accordance with an additional feature of the invention, the welding together of the at least partially overlapping metal foils may be effected continuously, but alternatively may be provided intermittently or in a pulsed manner. In the continuous welding mode, the metal foils may be joined by weld seams which extend without interruption along the overlap region. In such a case, the weld seam fully coincides with the line along which the welding is effected. In the intermittent or discontinuous welding mode, the weld seams have at least one interruption of the weld seam along the welding line and therefore along the longitudinal extent of the overlap region. In particular, this also includes pulsed welding, whereby a welding operation is effected only at specific time intervals while the welding apparatus is travelling along the welding line. The result in this case is an interrupted weld seam, which only partially coincides with the welding line.

In accordance with yet another feature of the invention, the welding line, along which the welding of the metal foils is effected, may in particular have a periodic shape along the longitudinal extent of the overlap region of the metal foils. In such a case, the shape of the weld seam may, for example, be sinusoidal, meander-like, zigzag or stepped. The periodic length of the weld seam in such a case also determines the maximum length of the open regions between metal foils in their overlap region in the direction of the longitudinal extent of the overlap region, i.e. the maximum length of the non-continuous leakage channels along the weld seam. Thus, it is also proposed that gaskets, which are manufactured from the layered composites according to the invention, are required to have a gasket width which is greater than the periodic length of the weld seam in order not to have any open leakage channels. Therefore, given a periodic shape of the weld seams, the periodic length is usually selected so as to be less than 25 mm. Preferably, when welding with a periodic shape of the weld seam, a periodic length of between 0.5 and 5 mm is selected. In a particularly preferred manner periodic lengths of between 1 and 2 mm are selected. It is likewise possible, when welding the metal foils together through the use of weld seams with a periodic shape, for the periodic length to vary along the overlap region.

In accordance with yet a further feature of the invention, the metal foils, in webs, are preferably displaced continuously at a constant speed relative to a stationary welding apparatus. The welding of the metal foils in the context of the present invention may be effected by all suitable, known welding methods, e.g. resistance welding or laser beam welding. The welding is, however, preferably effected by laser beam. The weld seam is therefore preferably a laser weld seam. Laser beam welding is preferably effected by deflecting the laser beam in an oscillating manner from a center line. It is possible to adjust the shape, the thickness, the transverse extent, i.e. the maximum total extent of the welding line at right angles to the longitudinal extent of the overlap region, and the periodic length of the weld seam, by selecting the amplitude, frequency, focal position and power of the laser beam and the web speed of the metal foils. A further configuration is possible in that welding is effected continuously or in a pulsed manner.

In accordance with yet an added feature of the invention, prior to being welded together, the metal foils are disposed so as to overlap at least partially. The width of the overlap region in the present case should be substantially constant over the entire foil web length. The width of the overlap region of the metal foils may vary from section to section as a result of external influences such as temperature variations and/or vibrations or other influences. A further possibility is that the metal foils merely abut one another in one section. The metal foils would then only partially overlap. Therefore, with the metal-reinforced layered composites according to the invention, the joining of the individual metal foils which jointly form an intermediate metal layer may be effected in such a way that the metal foils at their mutually adjacent marginal regions partially or completely overlap and the foil ends also partially directly abut one another. The maximum width of the overlap region of the foils is usually set at less than 10 mm. The maximum width of the overlap region should be preferably between 0.2 mm and 2 mm, and in a particularly preferred manner between 0.5 mm and 1 mm.

In accordance with yet an additional feature of the invention, it is also possible for the metal foils first to be mechanically interlocked, before then being welded together. All of the leakage channels resulting from interlocking are then interrupted by such measures.

In accordance with again another feature of the invention, the transverse extent of the weld seam is, inter alia, even in the case of a periodic shape of the weld seam, greater than or equal to the maximum width of the overlap region. The transverse extent of the weld seam is, in a preferred manner, 1 to 2 times, and in a particularly preferred manner 1.1 to 1.5 times, the maximum width of the overlap region of the metal foils. In order to produce such a weld seam, the sum of the transverse extent of the welding line plus the width of the weld seam during welding has to be likewise greater than or equal to, or in a preferred manner 1 to 2 times and in a particularly preferred manner 1.1 to 1.5 times, the maximum transverse extent of the overlap region of the metal foils.

In accordance with again a further feature of the invention, in the case, for example, of a sinusoidal periodic weld seam, the transverse extent of the weld seam, upon implementation of the laser beam welding method preferred according to the invention, is equal to the transverse extent of the welding line, i.e. the lateral deflection amplitude, plus the width of the weld seam. In the case of a linear weld seam, the transverse extent of the weld seam would correspond exactly to the width of the weld seam.

In accordance with again an added feature of the invention, if, in the case of the metal-reinforced layer ed materials according to the invention, the welding together of the metal foils which form the intermediate metal layers is effected entirely or partially in pulsed-mode operation, then, in order to prevent leakage channels in the overlap region of the metal foils along the longitudinal direction of the overlap region, the width of the individual welding spots is to be selected in such a way that they at least partially overlap in their extent. The pulsed-mode operation of the laser can, e.g. given a constant pulse cycle and uniform feed of the metal foils relative to the welding apparatus, lead to welding spots along the welding line which are situated at a constant distance apart from one another along the longitudinal extent of the overlap region. The welding line itself may have a periodic shape, e.g. in the manner described above. In this case, for example, as well as with other welding lines which the metal-reinforced layered composites according to the invention include, individual successive welding spots are mutually offset in the width direction of the overlap region. Since the individual welding spots overlap in the present case, these individual welding spots therefore form a weld seam which extends over the entire width of the overlap region. In particular, such welding together of the metal foils may be effected in such a way that successive welding spots are positioned alternately on one or the other side in the direction of the width of the overlap region. In other words, the welding apparatus swings back and forth from welding spot to welding spot over the entire width of the overlap region.

In accordance with again an additional feature of the invention, the weld seam may in particular also include individual spots, the diameter of which is greater than or equal to the maximum width of the overlap region of the metal foils. This may be effected, for example, by resistance spot welding or pulsed laser beam welding.

In accordance with still another feature of the invention, the thickness of the weld seam, e.g. in the case of spot welding, may be greater than or equal to or approximately 1 to 2 times the maximum width of the overlap region of the metal foils. However, the thickness of the weld seam is preferably 0.25 to 0.9 mm and particularly preferably 0.4 to 0.7 mm.

In accordance with still a further feature of the invention, the weld seam may also have a linear course parallel to the longitudinal extent of the overlap region of the metal foils.

The welding of such a weld seam is then effected likewise along a linear welding line parallel to the longitudinal extent of the overlap region of the metal foils. When two metal foils are joined at least partially exclusively by such a weld seam, with a layered composite according to the invention, the width of this one weld seam has to be greater than the maximum width of the overlap region. On one hand, this weld seam produced in a welding operation has a planar configuration, with the overlapping region of the metal foils being fully welded together. Such a form of the weld seam may, on the other hand, also be achieved e.g. by a sinusoidal welding line driven in the laser beam welding method, with the oscillating frequency being set so high that the temporally successive seams come very close to and/or touch one another or overlap.

The present invention also includes embodiments in which the metal foils are welded together in the following manner: (a) a plurality of linear, juxtaposed weld seams are directed in the longitudinal extent of the overlap region and overlap, with the total width of the resultant total weld seam being greater than or equal to the maximum width of the overlap region, and with the welding being effected in a plurality of welding operations, and (b) a linear weld seam is combined with at least one weld seam having a shape, which at least at one point, includes a direction component at right angles to the longitudinal extent of the overlap region of the metal foils, and with the direction component of the last-mentioned weld seam being greater than or equal to the width of the overlap region of the metal foils at that point. Procedure (b) has the advantage of permitting very thin metal foils to be welded together. First, the at least partially overlapping foils are welded together by a linear weld seam with a low energy input and therefore with low distortion. The existing leakage channels are subsequently closed, for example, through the use of a sinusoidal weld seam.

In accordance with still an added feature of the invention, the welded intermediate metal layer may also be provided with at least one passage in the overlap region of the metal foils, wherein the weld seam itself may follow a linear welding line along the longitudinal extent of the overlap region or may alternatively have any shape such as was previously described above for the metal-reinforced layered composites according to the invention. This passage is greater than or at least equal to the maximum width of the overlap regions of the metal foils. The passages are closed by the soft material layers, which lie adjacent the intermediate metal layers and completely fill the opening of the passage. The result of this filling with the gas-proof soft materials is that there are no gaps in the overlap region of the metal foils in the region of the passages. Thus, possible continuous leakage channels are avoided and the maximum length of leakage channels, which are still possible in the overlap region and have a limited extent in the direction of the longitudinal extent of the overlap region, extends from passage to passage.

In accordance with still an additional feature of the invention, the metal foils are preferably provided in the overlap region with numerous passages so that the overlap region includes passages at intervals, preferably at constant intervals, along the overlap region. The maximum spacing of the passages along the overlap region is usually at most 25 mm, preferably in the region of between 1 mm and 10 mm, and particularly preferably in the region of between 2 mm and 5 mm.

In accordance with another feature of the invention, in this case, the welded intermediate metal layer may be manufactured as a spiked metal sheet, in which passages are produced in the intermediate layer and even outside the overlap region using any desired methods such as e.g. punching or needling. Preferably, the passages are produced by needling from both sides of the metal foils.

In accordance with a further feature of the invention, first the welding of the metal foils and then the creation of the passages is effected. In general, however, a reversal of the process steps is also conceivable.

In accordance with an added feature of the invention, the thicknesses of the metal foils in the context of the present invention are preferably up to about 250 μm, more preferably about 25 to 125 μm and particularly preferably about 50 to 100 μm.

Metal foils, which are used in the context of the present invention, are preferably made of nickel or iron materials.

It is particularly preferable if they are made of steel, nickel, Ni-based alloys or special steels such as chrome nickel steels.

In accordance with an additional feature of the invention, the web width of the metal foils, which are welded together, is preferably ≧300 mm. They may, however, also have any other desired width. Two or more metal foils or metal layers may be welded together simultaneously or in succession.

The intermediate metal layers in the context of the present invention are preferably smooth metal foils or spiked metal sheet. A spiked metal sheet has numerous passages, which are produced by needling from one or both sides of the metal foils and are preferably uniformly distributed over the entire surface. These passages preferably have crown-shaped continuations which extend out and away from the surface of the metal foils. These crown-shaped continuations are used to secure further layers, e.g. soft material foils, mechanically by enmeshing. Preferably, needles having a square or round cross section are used. The passages then also have a square or round shape.

In accordance with yet another feature of the invention, in the context of the present invention, the intermediate metal layers are joined to at least one layer of soft material. The metal-reinforced layered composites according to the invention preferably include at least two layers of soft material, in which at least one intermediate metal layer is embedded. In an advantageous manner, the soft materials are applied onto the intermediate metal layers in the form of soft material layers, which preferably completely cover both sides of the intermediate metal layers. This may include e.g. the following configurations: soft material layer/intermediate metal layer/soft material layer or soft material layer/intermediate metal layer/soft material layer/intermediate metal layer/soft material layer.

In the context of the present invention, the soft materials are soft, adaptable, gas-proof, to some extent flexible materials which apply themselves particularly in a sealing manner against the surface of the metal foils and weld seams. The soft materials are, for example, expanded graphite, mica and polytetrafluoroethylene (PTFE). One or several different soft materials may be used in a metal-reinforced layered composite according to the invention.

In accordance with yet a further feature of the invention, the soft materials are preferably used in the context of the present invention in the form of soft material foils or laminates. These foils preferably have a thickness of about 0.2 to 2.0 mm, particularly preferably about 0.5 to 1.0 mm.

In accordance with yet an added feature of the invention, foils of expanded graphite which have a density of about 0.7 to 1.4 g/cm³ are particularly preferably used. Foils of expanded graphite have a high temperature stability and media resistance.

In accordance with yet an additional feature of the invention, the metal-reinforced layered composites are preferably used as gasket sheets. Gaskets of any desired shape may be manufactured e.g. by being punched out of the layered composites or gasket sheets according to the invention. Such gaskets may be flat gaskets, preferably annular flange gaskets or annular stuffing box packings.

Gaskets made from the layered composites according to the invention are used, for example, in the chemical industry, in power stations and in vehicle construction, e.g. as cylinder head gaskets and stuffing box packings for the purpose of sealing spindles.

The present invention has, inter alia, the following advantages:

Gaskets manufactured from the metal-reinforced layered composites according to the invention, with the welding together of the metal foils in the layered composites being effected in accordance with the geometric dimensions of the gaskets, have at least no continuous leakage channels at least in the region of the weld seam of the intermediate metal layers. They therefore have low leakage rates similar or identical to gaskets manufactured from layered composites, which have single-piece metal foils, i.e. metal foils without imperfections. Reference is also made, in that regard, to the examples and comparative examples.

The fact that the metal-reinforced layered composites according to the invention may be manufactured in large sizes means that there is less punching of waste when manufacturing gaskets. There is moreover the possibility of producing larger gaskets, e.g. annular flat gaskets having an outside diameter greater than 1 m, which are not inferior in quality to the previously known gaskets manufactured from layered composites with single-piece intermediate metal layers.

The present invention may also help to save material costs because metal foil webs having a lower width may be less expensive to purchase or more easily available than metal foil webs with greater widths.

With the objects of the invention in view there is additionally provided, a metal layer, comprising at least two at least partially overlapping metal foils which are joined to one another in an overlap region by at least one weld seam, wherein at the at least one weld seam in the overlap region between the metal foils there are no open regions and/or no continuous open regions in the longitudinal extent of the overlap region which, upon application thereof in metal foils in a layered material, act as leakage channels in the longitudinal extent of the overlap region. These metal foils may, in accordance with the welded intermediate metal layers of the metal-reinforced layered composites according to the invention, include welded metal foils and have corresponding passages. The inventive use of the metal layers relates to the use for manufacturing metal-reinforced layered composites, gasket sheets, gaskets and in particular flat gaskets made of at least one soft material.

Other features which are considered as characteristic for the invention are set forth in the appended claims.

Although the invention is illustrated and described herein as embodied in a layered composite with a welded intermediate metal layer, a gasket, a gasket sheet, a metal layer and a method of manufacturing a layered composite, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 contains two views of a metal-reinforced layered composite according to prior art, in which FIG. 2a is a fragmentary, diagrammatic, plan view and FIG. 2b is a fragmentary, sectional view taken along a line IIb—IIb through the gasket sheet according to FIG. 2a, in the direction of the arrows;

FIG. 3 contains three views of an embodiment of a metal-reinforced gasket sheet according to the present invention, in which

FIG. 4 contains two views of an intermediate metal layer with a possible welding line according to the present invention, in which FIG. 4a is a fragmentary, plan view and FIG. 4b is an enlarged portion of a weld seam shape IVb of FIG. 4a;

FIG. 7 contains two views of prior art embodiment of a metal-reinforced gasket sheet, in which FIG. 7a is a fragmentary, plan view and FIG. 7b is a fragmentary, cross sectional view through a metal-reinforced gasket sheet which is taken along a line VIIb—VIIb of FIG. 7a, in the direction of the arrows;

FIG. 8 contains two views of an embodiment of a metal-reinforced gasket sheet according to the present invention, in which FIG. 8a is a fragmentary, plan view and FIG. 8b is a cross-sectional view taken along a line VIIIb—VIIIb through the metal-reinforced gasket sheet of FIG. 8a, in the direction of the arrows.

DESCRIPTION OF THE PREFERRED EMBODIMENTS

Figure 1:
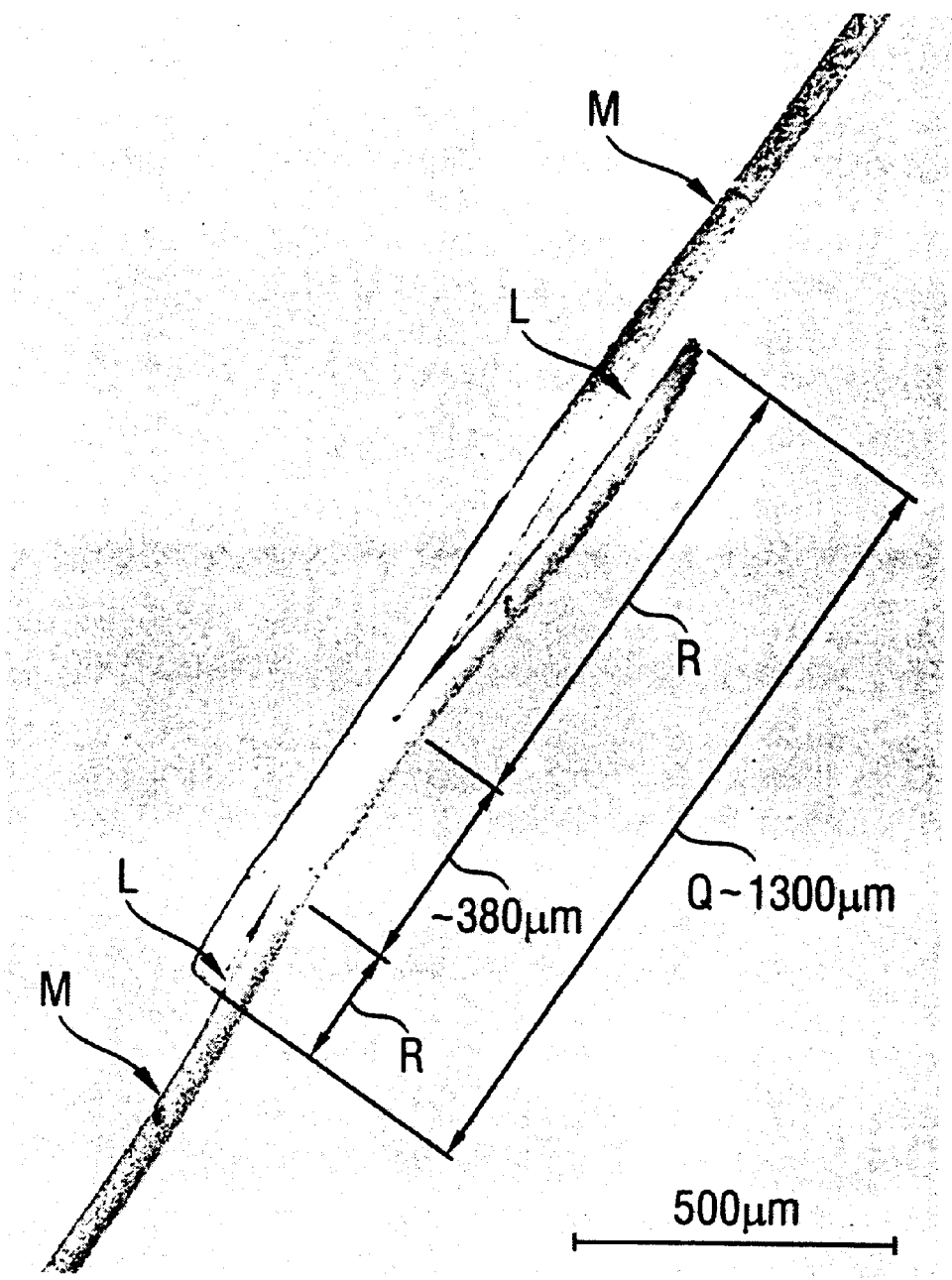
FIG. 1 is a micrograph of smooth, 50 μm thick metal foils which, in accordance with the prior art, have been overlapped and joined by a linear weld seam and in which leakage channels that arise are also illustrated.

Referring now to the figures of the drawings in detail and first, particularly, to FIG. 1 thereof, there is seen a micrograph of smooth metal foils which, in accordance with the prior art, have been overlapped and joined by a linear weld seam. To that end, two 50 μm thick metal foils M were disposed so as to overlap and were joined by a weld seam. The thickness of the weld seam in the illustrated section is roughly 380 μm and the width Q of the overlap region of the metal foils M is roughly 1300 μm(=1.3 mm). The drawing reveals that non-welded projecting regions R of metal foil arise in the overlap region of the metal foils M. Channels are provided in the longitudinal extent of the overlap region of the metal foils M between these projecting regions R and the metal foils M. Due to their poor accessibility, these channels are not filled with soft material during the manufacture of e.g. soft material gasket sheets. The result is therefore leakage channels L, which lead to an increase of leakage rates of gaskets manufactured from these gasket sheets.

Figure 2:
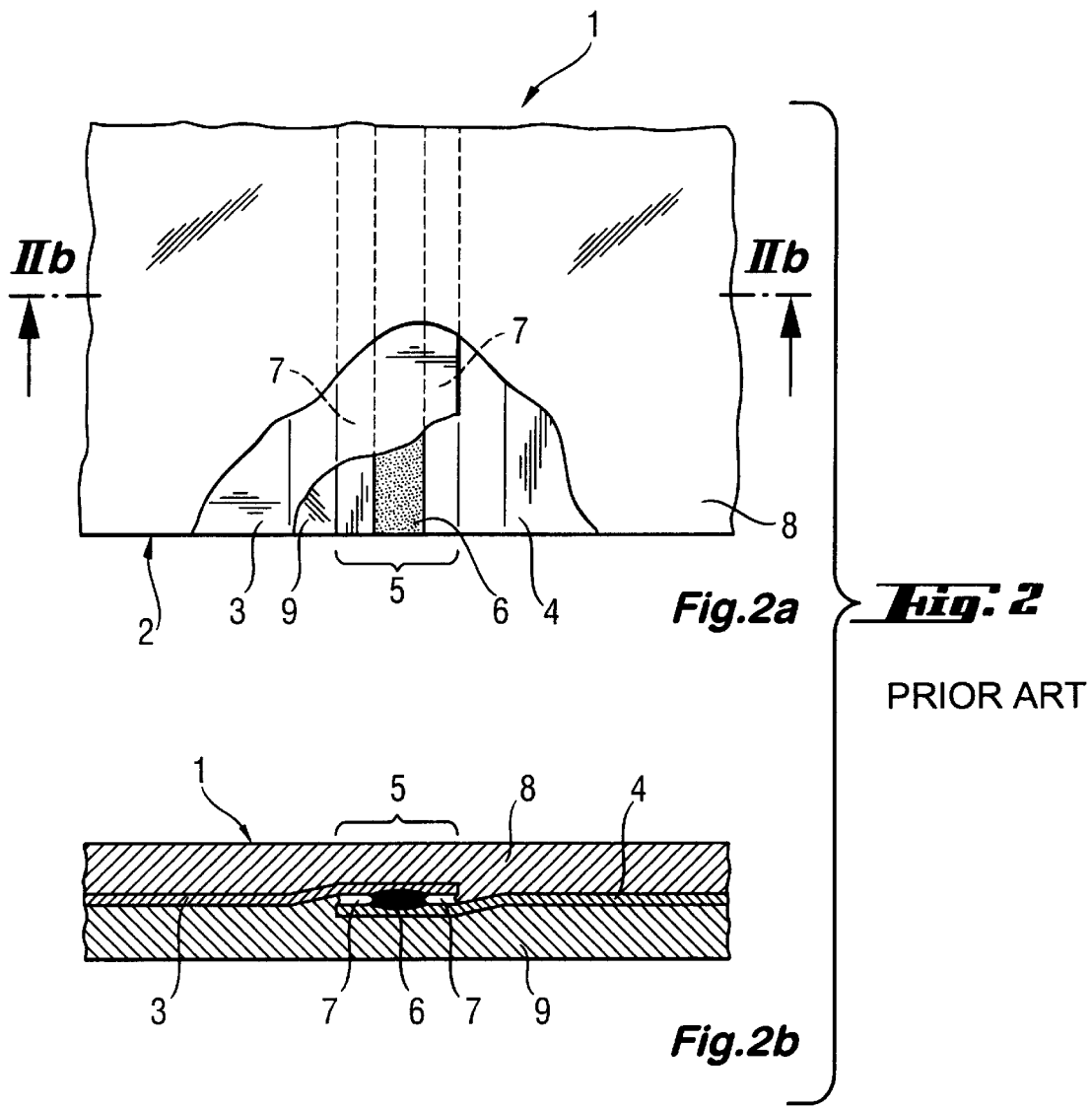

FIG. 2 shows a metal-reinforced layered composite 1 made of at least one soft material according to the prior art, which has an intermediate metal layer 2 embedded in two layers 8 and 9 of a soft material. As the plan view of FIG. 2a reveals, this intermediate metal layer 2 includes two smooth metal foils 3 and 4 which are welded together in an overlap region 5 thereof by a linear weld seam 6. The cross section of FIG. 2b, which is taken along the line IIb—IIb shown in FIG. 2a, reveals that this construction gives rise, over the longitudinal extent of the overlap region 5, to leakage channels 7. Due to their poor accessibility, the leakage channels 7 are not sealed by the soft material layers 8 and 9. These leakage channels 7 are responsible for the high leakage rates of gaskets which are manufactured as gasket sheets from such layered composites 1.

Figure 3A:
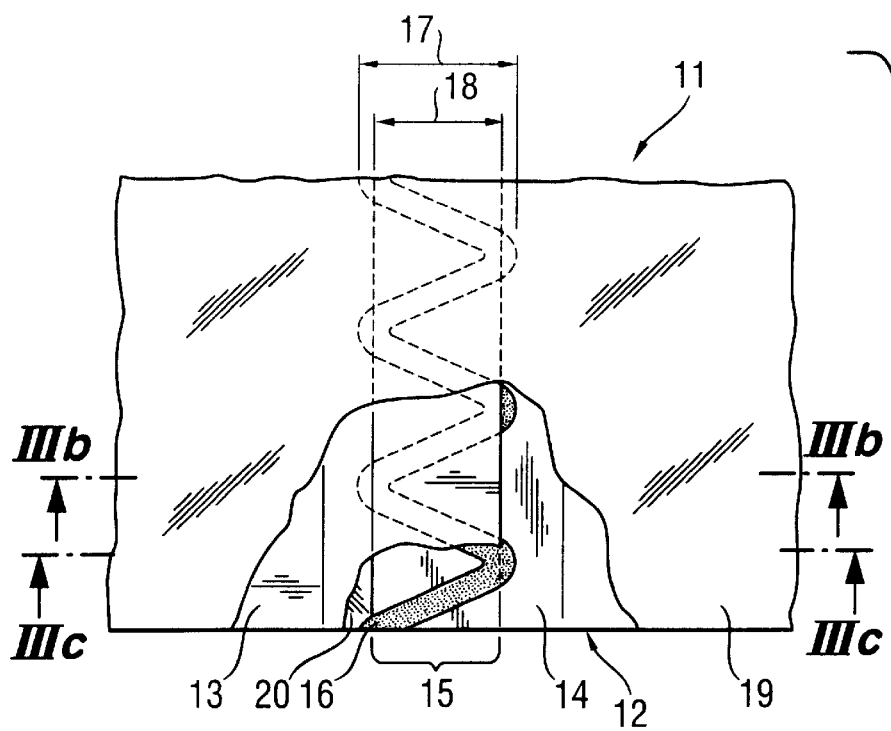
FIG. 3a is a fragmentary, plan view.
Figure 3B:
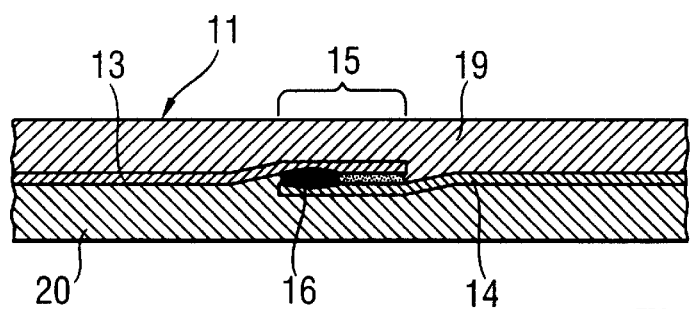
FIG. 3b is a fragmentary, sectional view which is taken along a line IIIb—IIIb through the gasket sheet according to FIG. 3a, in the direction of the arrows
Figure 3C:
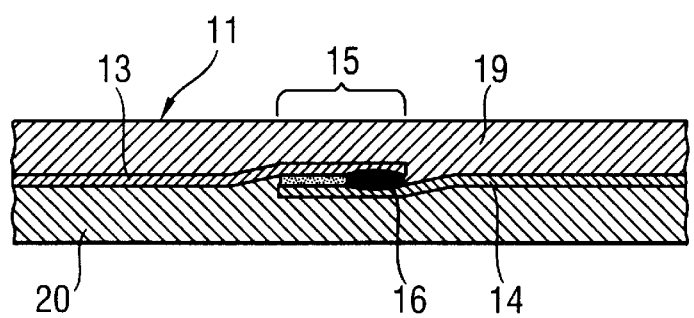
FIG. 3c is a fragmentary, sectional view which is taken along the line IIIc—IIIc through the gasket sheet according to FIG. 3a, in the direction of the arrows, and which is offset by half a periodic length of a weld seam relative to the line IIIb—IIIb.

FIG. 3 shows an embodiment of a metal-reinforced layered composite 11 according to the present invention, which is made of at least one soft material. FIG. 3a shows a plan view of the metal-reinforced layered composite 11. The metal-reinforced layered composite 11 includes an intermediate metal layer 12, which is embedded in two layers 19 and 20 of a soft material, e.g. expanded graphite. The intermediate metal layer 12 includes two metal foils 13 and 14, which are welded together in an overlap region 15 by a zigzag laser beam weld seam 16. A transverse extent 17 of the weld seam 16 is greater than a maximum width 18 of the overlap region 15 of the two metal foils 13 and 14. According to the invention, the metal-reinforced layered composite 11 is manufactured in such a way that the metal foils are welded together as webs, then cut into sheets and subsequently provided with the soft material layers 19 and 20. FIG. 3b shows a cross section which is taken along a line IIIb—IIIb through the metal-reinforced layered composite of FIG. 3a. The cross section reveals that the intermediate metal layer 12 is embedded between the soft material layers 19 and 20. The metal foils 13, 14 in this cross section do not form any excess lengths of metal foil in the left half of the overlap region because, in this case, they are joined together by the weld seam 16. The metal foils 13, 14 are not joined together in the right half of the overlap region so that, in this case, there is an open area in the overlap region between the metal foils which are to be joined. FIG. 3c shows a cross section taken along the line IIIc—IIIc through the metal-reinforced layered composite of FIG. 3a. The line IIIc—IIIc is offset by half a periodic length of the weld seam 16 relative to the line IIIb—IIIb. In this section, the metal foils 13, 14 are joined together in the right half of the overlap region 15 by the weld seam 16, whereas in the left half of the overlap region they are unconnected and lie one above the other. Therefore, in this case, there is an open area between the metal foils in the overlap region. A comparison of FIGS. 3b and 3c reveals that the open regions, which arise and may lead to leakage channels along the longitudinal extent of the overlap region, are periodically interrupted in the direction of the longitudinal extent of the overlap region as a result of the weld seam extending transversely over the entire overlap region. Therefore, the extent of possible leakage channels in the direction of the longitudinal extent of the overlap region corresponds at most to the periodic length of the weld seam. The metal-reinforced layered composite therefore has no continuous leakage channels 7 in the longitudinal extent of the overlap region 15 of the metal foils 13, 14. According to the invention, the present embodiment of a metal-reinforced layered composite 11 according to FIG. 3 can also be modified. According to that modification, after welding, the intermediate metal layer 12 is needled in order to obtain a spiked metal sheet, onto which the soft material layers 19 and 20 are subsequently applied.

A possible shape of the weld seam 16 of the present invention will now be described in detail with reference to FIG. 4. FIG. 4a shows an intermediate metal layer 12 of a metal-reinforced layered composite 11 according to the present invention. The intermediate metal layer 12 includes two overlapping metal foils 13, 14, which are welded together in the overlap region 15 by a zigzag weld seam 16. An arrow 21 indicates what is meant by a longitudinal extent of the overlap region 15 of the metal foils 13, 14. FIG. 4b shows a portion IVb of FIG. 4a. FIG. 4b shows an enlarged view illustrating the limits of the overlap region in the form of parallel dashes and the weld seam 16. This portion reveals that the weld seam 16 has a shape, which at least at one point P has a direction component 22 at right angles to the longitudinal extent 21 of the overlap region of the metal foils. The welding is effected continuously in this embodiment. This means that the weld seam coincides over its entire shape with a welding line along which the welding is effected.

Figure 5:
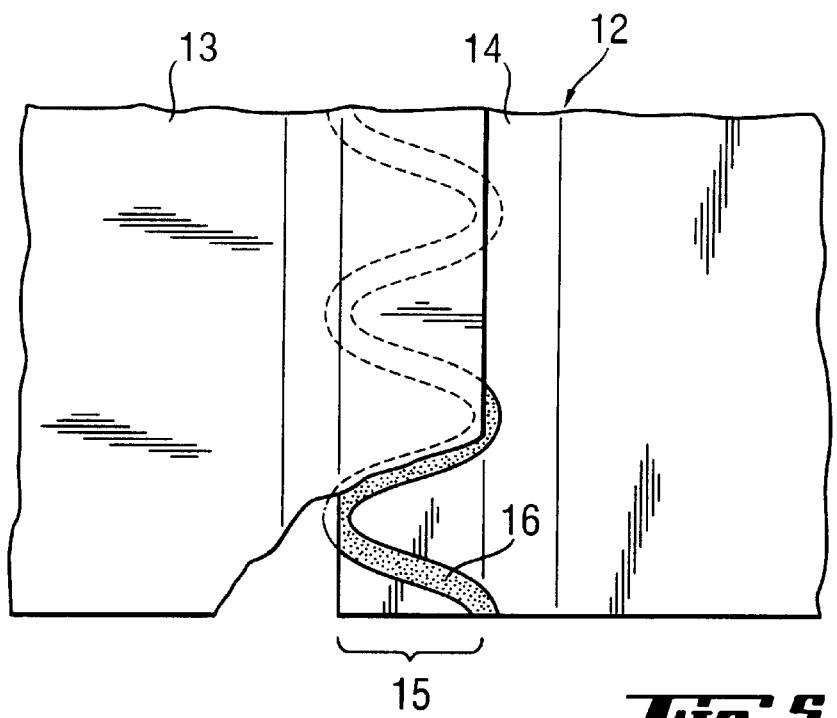
FIGS. 5 and 6 are fragmentary, plan views of intermediate metal layers with possible welding line courses according to the present invention.

FIG. 5 shows two metal foils 13, 14, which are joined together by a weld seam with a sinusoidal welding line in an overlap region 15 in accordance with the present invention. The welded metal foils 13, 14 form the intermediate metal layer 12. In this case too, the welding was effected continuously.

Figure 6:
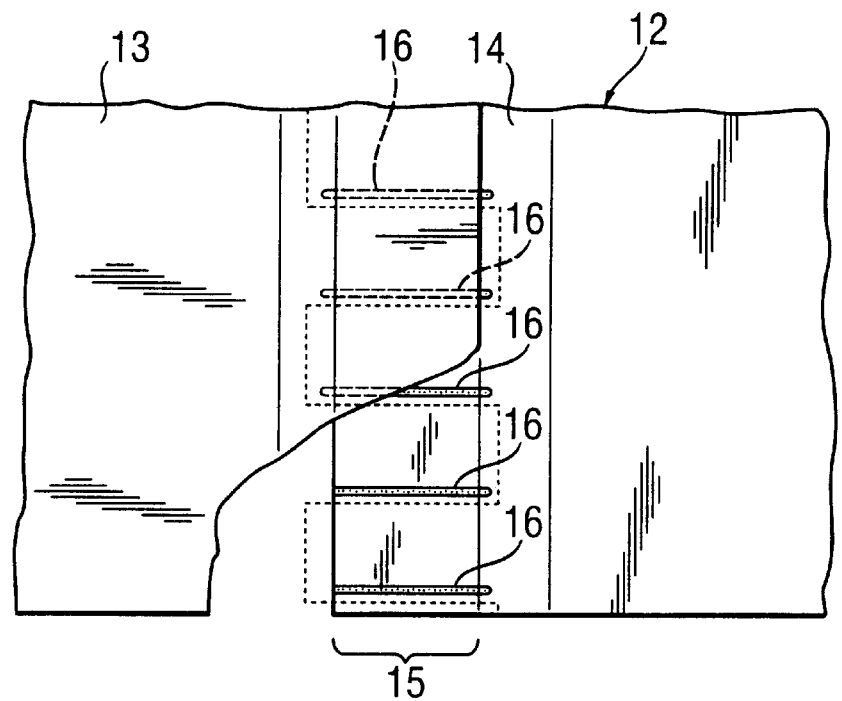

FIG. 6 shows an intermediate metal layer 12 according to the present invention. The metal foils 13, 14 are welded together in the overlap region 15 by a weld seam 16 having a ladder rung-shaped welding line (unbroken line). In this case, the welding was effected discontinuously, in particular in a pulsed manner. In contrast, the line along which the welding was effected is meander-like (broken line). An offset between the unbroken and broken lines is caused by the drawing. They actually lie one above the other.

FIG. 7 shows a prior art metal-reinforced layered composite 11 made of at least one soft material with an intermediate metal layer 12. FIG. 7a shows a plan view of the layered composite 11. The metal foils 13 and 14 are joined together in the overlap region 15 by a linear weld seam 16. After welding, the intermediate metal layer 12 was needled in order to create a spiked metal sheet. The needling was effected in such a way that no passages 23 were produced in the overlap region 15 of the metal foils 13 and 14. FIG. 7b is a section taken along the line VIIb—VIIb in FIG. 7a which shows that, in this layered composite 11, there are continuous leakage channels 7 in the direction of the longitudinal extent of the overlap region 15 of the metal foils 13, 14. The leakage channels extend directly alongside the weld seam.

Figure 8:
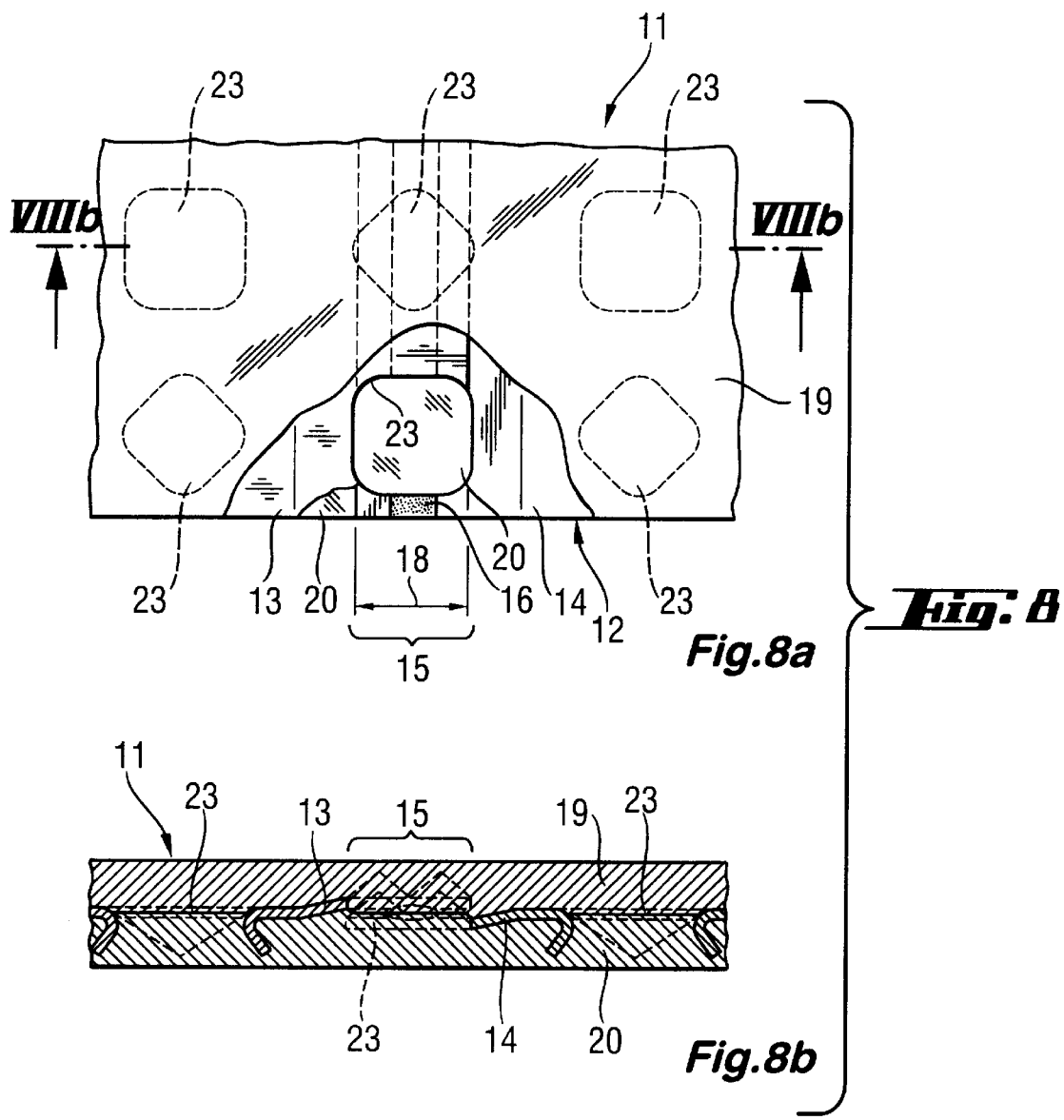

FIG. 8 shows a metal-reinforced layered composite 11 according to the present invention, which is made of at least one soft material. FIG. 8a shows a plan view of a gasket sheet 11. The intermediate metal layer 12 includes two metal foils 13 and 14 which are joined together in the overlap region 15 of the metal foils 13, 14 by a linear weld seam 16. The subsequent needling to produce a spiked metal sheet was effected in such a way as to provide passages 23 in the overlap region 15. The passages 23 are greater than or equal to the maximum width 18 of the overlap region 15. During a subsequent application of soft material layers 19, 20, the passages 23 are filled with soft material. This is evident from FIG. 8b, which shows a cross section through the layered composite of FIG. 8a that is taken along the line VIIIb—VIIIb. Any channels in the longitudinal extent of the overlap region 15 are interrupted in the region of the passages 23 by virtue of the passages being filled with soft material. No continuous leakage channels may arise. The length of the non-continuous leakage channels in the longitudinal extent of the overlap region extends at most from passage to passage.

Figure 9:
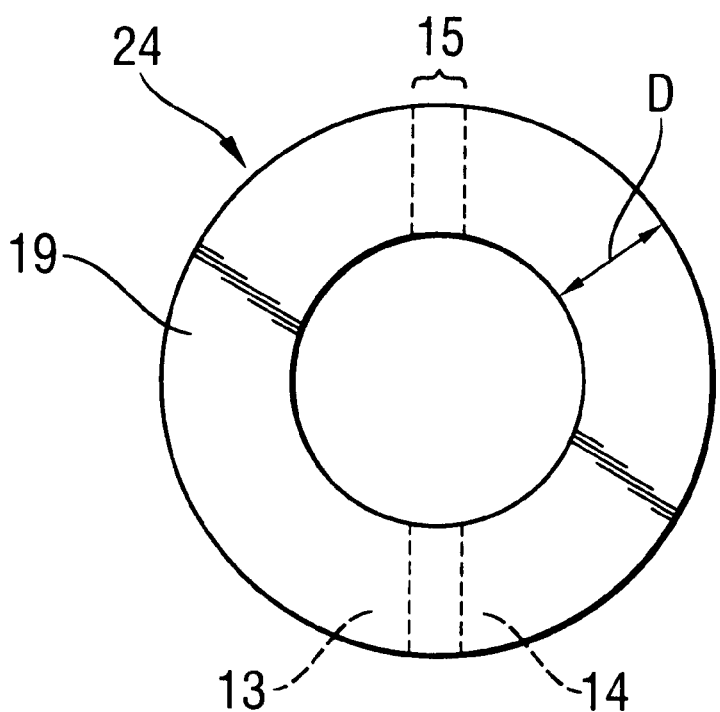
FIG. 9 is a plan view of flat gaskets according to the examples and comparative examples of the description of the present invention.

FIG. 9 shows an annular flat gasket 24 according to the examples and comparative examples of the description of the present invention. Such gaskets are punched out of the gasket sheets in such a way that the overlap region 15 of the metal foils is situated, for example, in the illustrated position. Reference symbol D denotes a gasket width of the gasket. It is advantageous to ensure that such a gasket does not have leakage rates which are higher than the leakage rates of gaskets having exclusively single-piece intermediate metal layers, despite the weld seams. Therefore, the welding together of the metal foils of the intermediate metal layer and/or the provision of passages in the overlap region of the metal foils is to be effected in such a way that the extent of open regions possibly left between the metal foils in the overlap region is less in the longitudinal direction of the overlap region of the metal foils than the gasket width D.

The present invention will now be described in detail with reference to the following examples and by using layered composites as an example:

EXAMPLE 1

Two 50 $\mu$m thick, smooth special steel foils (material No. 1.4401) having a width of 540 and 1000 mm, respectively, were withdrawn from two braked take-off units equipped with optical foil lateral edge control units. The two metal foil webs were conveyed continuously with an overlap of about 1±0.75 mm over a bronze roller. As a result of an applied web tension, the two foils were pressed one on top of the other and welded together in the overlap region in a focal point of an Nd-YAG laser beam (manufactured by Rofin-Sinar, Gunding: type RSY 300P1/CW). In this case, the laser beam is deflected with the aid of a swivel mirror at right angles to the overlap region. The oscillating amplitude of the laser beam was 1 mm. The zero position of the laser beam was identical to the center line of the overlap region. The web speed was 0.9 m/min, the oscillating frequency of the laser beam lateral deflection was 12 Hz and the welding current (lamp current) was set at 25 A. The resultant zigzag weld seam as shown e.g. in FIG. 4a, which joined the metal foils in their overlap region, had a periodic length of 1.25 mm and the width of the weld seam was about 0.5 mm. The thus welded metal foil web was then trimmed at the edge to a width of 1500 mm and wound onto a torque-controlled take-up apparatus. A metal foil-reinforced layered composite based on graphite foil was manufactured as a gasket sheet with the intermediate metal layers welded together in this manner and using the method described in European Patent EP 0 616 884 B1, corresponding to U.S. Pat. No. 5,509,993. Such a metal-reinforced gasket sheet in this case included 4 layers of 0.5 mm thick graphite foil having a density of 1.1 g/cm$^3$ and three metal foil layers. The sequence of the layers was graphite foil/welded metal foil/graphite foil/single-piece metal foil/graphite foil/welded metal foil/graphite foil.

Flat gaskets were punched out of this gasket sheet in accordance with the positional relationship shown in FIG. 9, in order to subsequently determine the leakage rates of the gaskets in accordance with DIN 28090-1. The measurement results may be seen in Table 1.

COMPARATIVE EXAMPLE 1/1

A metal-reinforced layered composite based on graphite foil was manufactured according to Example 1 as a gasket sheet, although with all three metal foils being single-piece.

In an analogous manner to Example 1, flat gaskets were punched out of the gasket sheet and their leakage rates were determined in accordance with DIN 28090-1 (see Table 1).

COMPARATIVE EXAMPLE 1/2

A metal-reinforced layered composite based on graphite foil was manufactured according to Example 1 as a gasket sheet. However, the welded metal foils had a linear weld seam rather than a zigzag seam. The welding was effected analogously to the method described in Example 1 except that the oscillation amplitude of the laser beam lateral deflection was set to 0.

Again in an analogous manner to Example 1, flat gaskets were punched out of the gasket sheet and their leakage rates were determined in accordance with DIN 28090-1 (see Table 1).

TABLE 1

Leakage rates of flat gaskets according to Example 1, Comparative Example 1/1 and Comparative Example 1/2

|  | Example 1 | Comparative Example 1/1 | Comparative Example 1/2 |
| --- | --- | --- | --- |
| Metal foils | 1 x single-piece; 2 x with zigzag weld seam | 3 x single-piece | 1 x single-piece; 2 x with linear weld seam |
| Leakage rate according to DIN 28090-1 [mg/(m · s)] | 0.07–0.1 | 0.07–0.1 | 2.5–48 |

These gasket sheets had one single-piece intermediate metal layer and intermediate metal layers including two metal foils joined by zigzag weld seams. On one hand, it is apparent from Table 1 that the gaskets manufactured from these gasket sheets had leakage rates as low as the gaskets manufactured from gasket sheets with exclusively single-piece intermediate metal layers.

On the other hand, gaskets manufactured from gasket sheets which included one single-piece intermediate metal layer and intermediate metal layers including two metal foils joined by linear weld seams, had leakage rates more than ten times higher.

EXAMPLE 2

In this example, 0.1 mm thick metal foils were used. The welding parameters of the zigzag weld seam were: oscillating frequency 12 Hz, lamp current 31 A, pendulum swing width about 1.3 mm. The web speed was 1.8 m/min and the width of the overlap region of the foils varied between about 0.4 and 1.5 mm. The metal foils that were welded together were then needled to provide a spiked metal sheet. A layered composite having a layer sequence: graphite foil (thickness 1 mm, density 1.0 g/cm$^3$)/welded spike sheet/graphite foil (thickness 1 mm, density 1.0 g/cm³) was mechanically bonded through the use of a pressing operation as a gasket sheet. In regard to the further processing conditions, see Example 1, provided they do not conflict with those described herein.

In an analogous manner to Example 1, flat gaskets were punched out of the gasket sheet and the leakage rates were determined in accordance with DIN 28090-1 (see Table 2).

COMPARATIVE EXAMPLE 2/1

A gasket sheet was manufactured in the manner described in Example 2 except that the intermediate spiked metal sheet layer was a single piece. Once again, flat gaskets were punched out and leakage rates were measured (see Table 2).

COMPARATIVE EXAMPLE 2/2

A gasket sheet was manufactured in the manner described in Example 2 except that the intermediate spiked metal sheet layer had a linear weld seam, as shown in FIG. 7. The spiked metal sheet therefore had no passages in the overlap region of the metal foils. The leakage rates of the flat gaskets, which were punched out of this gasket sheet, are likewise shown in Table 2.

EXAMPLE 2/3

A gasket sheet was manufactured in the manner described in Example 2 except that the intermediate spiked metal sheet layer had a linear weld seam, as shown in FIG. 8. The spiked metal sheet therefore had passages in the overlap region of the metal foils, which covered the entire overlap region. The leakage rates of the flat gaskets, which were punched out of this gasket sheet, are also shown in Table 2.

TABLE 2

Leakage rates of flat gaskets according to Example 2, Comparative Example 2/1, Comparative Example 2/2 and Example 2/3

|  | Example 2 | Comparative Example 2/1 | Comparative Example 2/2 | Example 2/3 |
| --- | --- | --- | --- | --- |
| Spiked sheet | with zigzag weld seam | single-piece | with linear weld seam, no passages in overlap region | With linear weld Seam and passages in overlap region |
| Leakage rates according to DIN 28090-1 [mg/(m · s)] | 0.07–0.11 | 0.08–0.10 | 2.0–26 | 0.09–0.11 |

On one hand, Table 2 shows that the leakage rates determined for the flat gaskets with the zigzag weld seam or the linear weld seam with passages in the overlap region of the metal foils were substantially identical to the leakage rates of the flat gaskets reinforced with single-piece spiked sheet.

On the other hand, leakage rates several times higher were obtained from the gasket samples with the linearly welded intermediate spiked sheet metal layer. Contrary to the teaching of the present invention, they had no passages in the overlap region of the metal foils.

The measurement of the leakage rates was effected for all of the above examples according to DIN 28090-1 in accordance with the test specifications for the preliminary test according to section 7.3.3. In accordance with Table 11 of the above-mentioned DIN standard, the leakage rates of the gasket sheets were measured at a sealing surface pressure after internal pressure relief of 30 N/mm² and a test pressure of 40 bar sampling nitrogen gas. Sampling, sample dimensions and sample preconditioning as well as testing apparatus corresponded to the standard DIN 28090-1. In the case of each of the above examples, 5 samples were tested.

We claim:

1. A metal-reinforced layered composite of at least one soft material, comprising:
at least one intermediate metal layer formed of at least two at least partially overlapping metal foils joined to one another by at least one weld seam without an adhesive or sealant in an overlap region having a longitudinal extent such that there is no continuous leakage channel in said longitudinal extent of said overlap region and therefore having a low leakage rate.

2. The metal-reinforced layered composite according to claim 1, including outwardly-directed flat sides, and a gas-proof foil made of an organic polymer completely covering and joined to said flat sides.

3. The metal-reinforced layered composite according to claim 1, including a non-continuous leakage channel having a maximum length of less than 25 mm in said longitudinal extent of said overlap region.

4. The metal-reinforced layered composite according to claim 1, including a non-continuous leakage channel having a length of between 0.5 and 5 mm in said longitudinal extent of said overlap region.

5. The metal-reinforced layered composite according to claim 1, including a non-continuous leakage channel having a length of between 1 and 2 mm in said longitudinal extent of said overlap region.

6. The metal-reinforced layered composite according to claim 1, wherein said overlap region of said metal foils has a maximum width of less than 10 mm.

7. The metal-reinforced layered composite according to claim 1, wherein said overlap region of said metal foils has a width of between 0.2 mm and 2 mm.

8. The metal-reinforced layered composite according to claim 1, wherein said overlap region of said metal foils has a width of between 0.5 mm and 1 mm.

9. The metal-reinforced layered composite according to claim 1, wherein said metal foils have a given length, and said overlap region of said metal foils extends entirely along said given length.

10. The metal-reinforced layered composite according to claim 1, wherein said at least one weld seam includes, at least at one point, at least one weld seam having a course with a direction component at right angles to said longitudinal extent of said overlap region of said metal foils.

11. The metal-reinforced layered composite according to claim 1, wherein said at least one weld seam includes at least one weld seam extended without interruption along said overlap region.

12. The metal-reinforced layered composite according to claim 1, wherein said at least one weld seam has a periodic course along said overlap region.

13. The metal-reinforced layered composite according to claim 1, wherein said at least one weld seam includes at least one weld seam having a course selected from the group consisting of a sinusoidal course, a meander course, a zigzag course, and a ladder-rung course.

14. The metal-reinforced layered composite according to claim 12, wherein said periodic course of said weld seam has a periodic length of less than 25 mm.

15. The metal-reinforced layered composite according to claim 12, wherein said periodic course of said weld seam has a periodic length of between 0.5 mm and 5 mm.

16. The metal-reinforced layered composite according to claim 12, wherein said periodic course of said weld seam has a periodic length of between 1 mm and 2 mm.

17. The metal-reinforced layered composite according to claim 12, wherein said periodic course of said weld seam has a periodic length varying along said overlap region.

18. The metal-reinforced layered composite according to claim 1, wherein said overlap region of said metal foils has a maximum width, and said at least one weld seam has a transverse extent at least equal to said maximum width.

19. The metal-reinforced layered composite according to claim 18, wherein said transverse extent of said weld seam is approximately 1 to 2 times said maximum width of said overlap region of said metal foils.

20. The metal-reinforced layered composite according to claim 1, wherein said at least one weld seam includes at least one weld seam having at least one interruption along said longitudinal extent of said overlap region.

21. The metal-reinforced layered composite according to claim 1, wherein said overlap region of said metal foils has a maximum width, and said metal foils are at least partially pulsed-mode welded together creating welding spots having a width at least equal to said maximum width.

22. The metal-reinforced layered composite according to claim 1, wherein said metal foils are at least partially pulsed-mode welded together creating welding spots with a partially overlapping extent.

23. The metal-reinforced layered composite according to claim 1, wherein said metal foils are at least partially pulsed-mode welded together creating welding spots at least partially situated at constant intervals along said longitudinal extent of said overlap region.

24. The metal-reinforced layered composite according to claim 1, wherein said overlap region has a longitudinal direction and a width direction, and said metal foils are at least partially pulsed-mode welded together creating welding spots at least partially disposed successively in said longitudinal direction and mutually offset in said width direction.

25. The metal-reinforced layered composite according to claim 1, wherein said overlap region has a longitudinal direction, a width direction and sides, and said metal foils are at least partially pulsed-mode welded together creating welding spots disposed successively, at least to some extent, in said longitudinal direction and alternately positioned to said sides in said width direction.

26. The metal-reinforced layered composite according to claim 1, wherein said at least one intermediate metal layer formed of said at least two metal foils has at least one passage in said overlap region of said metal foils.

27. The metal-reinforced layered composite according to claim 10, wherein said at least one intermediate metal layer formed of said at least two metal foils has at least one passage in said overlap region of said metal foils.

28. The metal-reinforced layered composite according to claim 1, wherein said overlap region of said metal foils has a maximum width, said at least one intermediate metal layer formed of said at least two metal foils has at least one passage in said overlap region of said metal foils, and said at least one passage is at least equal to said maximum width.

29. The metal-reinforced layered composite according to claim 1, wherein said at least one intermediate metal layer formed of said at least two metal foils has passages in said overlap region of said metal foils, and said passages are disposed at intervals along said overlap region.

30. The metal-reinforced layered composite according to claim 1, wherein said at least one intermediate metal layer formed of said at least two metal foils has passages in said overlap region of said metal foils, and said passages are disposed at uniform intervals along said overlap region.

31. The metal-reinforced layered composite according to claim 1, wherein said at least one intermediate metal layer formed of said at least two metal foils has passages in said overlap region of said metal foils, and said passages are disposed at a spacing along said overlap region of at most 25 mm.

32. The metal-reinforced layered composite according to claim 1, wherein said at least one intermediate metal layer formed of said at least two metal foils has passages in said overlap region of said metal foils, and said passages are disposed at a spacing along said overlap region of between 1 mm and 10 mm.

33. The metal-reinforced layered composite according to claim 1, wherein said at least one intermediate metal layer formed of said at least two metal foils has passages in said overlap region of said metal foils, and said passages are disposed at a spacing along said overlap region of between 3 mm and 5 mm.

34. The metal-reinforced layered composite according to claim 1, wherein said at least one weld seam includes at least one weld seam at least partially having a linear course parallel to said longitudinal extent of said overlap region of said metal foils.

35. The metal-reinforced layered composite according to claim 34, wherein said overlap region has a maximum width, and said at least one weld seam with a linear course parallel to said longitudinal extent of said overlap region of said metal foils at least in part has a width at least equal to said maximum width.

36. The metal-reinforced layered composite according to claim 34, wherein said overlap region has a maximum width, and said at least one weld seam with a linear course parallel to said longitudinal extent of said overlap region of said metal foils has a width at least partially formed by a plurality of weld seams having a linear course parallel to said longitudinal extent of said overlap region of said metal foils placed alongside one another with said weld seams overlapping, resulting in a total weld seam having a total width at least equal to said maximum width.

37. The metal-reinforced layered composite according to claim 34, wherein said at least one weld seam with a linear course parallel to said longitudinal extent of said overlap region of said metal foils is at least partially combined with at least one weld seam having a course with a direction component, at least at one point, at right angles to said longitudinal extent of said overlap region.

38. The metal-reinforced layered composite according to claim 1, including at least one layer of at least one soft material associated with said at least one intermediate metal layer.

39. The metal-reinforced layered composite according to claim 1, wherein said metal foils have a thickness of up to approximately 250 $\mu$m.

40. The metal-reinforced layered composite according to claim 1, wherein said metal foils have a thickness of approximately 25 to 125 $\mu$m.

41. The metal-reinforced layered composite according to claim 1, wherein said metal foils have a thickness of approximately 50 to 100 $\mu$m.

42. The metal-reinforced layered composite according to claim 1, wherein said metal foils are made of a material selected from the group consisting of steel, nickel and chrome nickel steel.

43. The metal-reinforced layered composite according to claim 1, including at least two layers of at least one soft material in which said at least one intermediate metal layer is embedded.

44. The metal-reinforced layered composite according to claim 1, including only one soft material.

45. The metal-reinforced layered composite according to claim 1, including soft materials, one of said soft materials selected from the group consisting of expanded graphite, PTFE and mica.

46. The metal-reinforced layered composite according to claim 1, including soft materials each selected from the group consisting of expanded graphite, PTFE and mica.

47. The metal-reinforced layered composite according to claim 1, including only one soft material selected from the group consisting of expanded graphite, PTFE and mica.

48. The metal-reinforced layered composite according to claim 1, wherein said at least one intermediate metal layer is formed of a spiked sheet.

49. The metal-reinforced layered composite according to claim 1, wherein said at least one weld seam includes a plurality of weld seams joining said metal foils and all being at least one of resistance weld seams and laser beam weld seams.

50. A metal-reinforced layered composite gasket sheet of at least one soft material, comprising:
   at least one intermediate metal layer formed of at least two at least partially overlapping metal foils joined to one another by at least one weld seam without an adhesive or sealant in an overlap region having a longitudinal extent such that there is no continuous leakage channel in said longitudinal extent of said overlap region and therefore having a low leakage rate.

51. A metal-reinforced layered composite of at least one soft material for manufacturing flat gaskets or stuffing box packings, comprising:
   at least one intermediate metal layer formed of at least two at least partially overlapping metal foils joined to one another by at least one weld seam without an adhesive or sealant in an overlap region having a longitudinal extent such that there is no continuous leakage channel in said longitudinal extent of said overlap region and therefore having a low leakage rate.

52. A method for producing a metal-reinforced layered composite of at least one soft material and at least one metal layer, which comprises:
   producing at least one intermediate metal layer by welding at least two metal foils without an adhesive or sealant which are at least partially overlapping each other, along an overlap region such that, between the metal foils in the overlap region, there is no continuous open region in a longitudinal extent of the overlap region and therefore having a low leakage rate;
   coating the at least one of the intermediate metal layer with at least one layer of a soft material, and
   joining the at least one intermediate metal layer with the at least one layer of the soft material by pressing.

53. The method of manufacturing a metal-reinforced layered composite according to claim 52, which further comprises carrying out the welding together of the metal foils to provide open regions in the overlap region between the metal foils with a limited extent in the longitudinal extent of the overlap region.

54. The method of manufacturing a metal-reinforced layered composite according to claim 53, which further comprises carrying out the welding together of the metal foils to provide the open regions in the overlap region between the metal foils with a maximum extent of less than 25 mm, in the longitudinal extent of the overlap region.

55. The method according to claim 52, which further comprises carrying out the welding of the overlapping metal foils in the overlap region at least partially by performing the welding along a line having, at least at one point, a direction component at right angles to the longitudinal extent of the overlap region of the metal foils.

56. The method according to claim 52, which further comprises carrying out the welding at least partially to perform at least one welding operation along a linear line parallel to the longitudinal extent of the overlap region of the metal foils.

57. The method according to claim 52, which further comprises carrying out the welding at least partially along the longitudinal direction of the overlap region in a line having a course selected from the group consisting of a sinusoidal course, a meander course, a zigzag course, and a ladder-rung course.

58. The method according to claim 52, which further comprises carrying out the welding in one of a pulsed manner and continuously.

59. The method according to claim 52, which further comprises setting a transverse extent during welding to be at least partially at least equal to a maximum width of the overlap region of the metal foils.

60. The method according to claim 52, which further comprises setting a transverse extent during welding to be at least partially approximately 1 to 2 times a transverse extent of the overlap region of the metal foils.

61. The method according to claim 52, which further comprises carrying out the welding by at least one of resistance welding and laser beam welding.

62. A method for producing a metal-reinforced layered composite of at least one soft material and at least one metal layer, which comprises:
   producing an intermediate metal layer by welding at least two metal foils without an adhesive or sealant which are at least partially overlapping each other, along an overlap region such that there is no continuous leakage channel in said longitudinal extent of said overlap region and therefore having a low leakage rate;
   working at least one passage into the intermediate metal layer in the overlap region of the metal foils;
   coating the intermediate metal layer with at least one layer of a soft material; and
   joining the intermediate metal layer with the at least one layer of the soft material by pressing.

63. The method according to claim 62, which further comprises providing the at least one passage as numerous passages in the intermediate metal layer in the overlap region and outside the overlap region to create a spiked metal sheet.

64. A method for producing flat gaskets or stuffing box packings, which comprises:
   producing flat gaskets or stuffing box packings from plates of a metal-reinforced layered composite of at least one soft material and at least one metal foil which were produced by the method according to one of claims 52–63.

65. A gasket, comprising:
   a metal-reinforced layered composite of at least one soft material, having at least one intermediate metal layer formed of at least two at least partially overlapping metal foils joined to one another without an adhesive or sealant by at least one weld seam in an overlap region having a longitudinal extent such that there is no continuous leakage channel in said longitudinal extent of said overlap region and therefore having a low leakage rate.

66. The gasket according to claim 65, wherein said weld seam has a periodic length less than a gasket width.

67. A metal layer for manufacturing metal-reinforced layered composites from at least one soft material, comprising:

at least two at least partially overlapping metal foils joined to one another without an adhesive or sealant in an overlap region by at least one weld seam in an overlap region having a longitudinal extent and at least one weld seam such that there is no continuous open region in a longitudinal extent of said overlap region and therefore having a low leakage rate.

68. A metal layer for manufacturing metal-reinforced gasket sheets from at least one soft material, comprising:

at least two at least partially overlapping metal foils joined to one another without an adhesive or sealant in an overlap region by at least one weld seam such that there is no continuous open region in a longitudinal extent of said overlap region and therefore having a low leakage rate.

69. A metal layer for manufacturing metal-reinforced gaskets from at least one soft material, comprising:

at least two at least partially overlapping metal foils joined to one another without an adhesive or sealant in an overlap region by at least one weld seam such that there is no continuous open region in a longitudinal extent of said overlap region and therefore having a low leakage rate.

70. The metal layer according to claim 69, wherein said gaskets are flat gaskets.

* * * * *